(12) United States Patent
Uchino et al.

(10) Patent No.: US 10,420,164 B2
(45) Date of Patent: Sep. 17, 2019

(54) BASE STATION AND USER EQUIPMENT FOR CONFIGURING AN EXTENDED DRX

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 183 days.

(21) Appl. No.: 15/526,448

(22) PCT Filed: Mar. 15, 2016

(86) PCT No.: PCT/JP2016/058195
§ 371 (c)(1),
(2) Date: May 12, 2017

(87) PCT Pub. No.: WO2016/158394
PCT Pub. Date: Oct. 6, 2016

(65) Prior Publication Data
US 2017/0339745 A1  Nov. 23, 2017

(30) Foreign Application Priority Data

Apr. 3, 2015 (JP) ................. 2015-077226

(51) Int. Cl.
*H04W 76/28* (2018.01)
*H04W 52/02* (2009.01)
(Continued)

(52) U.S. Cl.
CPC ....... *H04W 76/28* (2018.02); *H04W 52/0203* (2013.01); *H04W 52/0206* (2013.01);
(Continued)

(58) Field of Classification Search
CPC ..................................................... H04W 76/28
See application file for complete search history.

(56) References Cited

U.S. PATENT DOCUMENTS

2013/0301501 A1\* 11/2013 Olvera-Hernandez .....................
H04W 52/0216
370/311
2016/0112948 A1 4/2016 Liang et al.
2018/0014249 A1\* 1/2018 Nagasaka ............. H04W 52/02

FOREIGN PATENT DOCUMENTS

| GB | 2514117 A | 11/2014 |
| WO | 2014/161376 A1 | 10/2014 |
| WO | 2014/162205 A2 | 10/2014 |

OTHER PUBLICATIONS

Office Action issued in corresponding Japanese Patent Application No. 2017-509523, dated Sep. 5, 2017 (6 pages).
(Continued)

*Primary Examiner* — Kent K Krueger
(74) *Attorney, Agent, or Firm* — Osha Liang LLP (57) ABSTRACT

Schemes for configuring a longer DRX cycle for user equipment are disclosed. One aspect of the present invention relates to a base station, comprising: a communication control unit configured to control radio communication with user equipment; and a DRX control unit configured to control discontinuous reception (DRX) by the user equipment, wherein the DRX control unit manages a system frame number (SFN), a subframe number and a hyper SFN (HSFN) in the radio communication, wherein the HSFN counts how many times the SFN wraps around, and uses the HSFN to configure an extended DRX (eDRX) having a specified reception period for the user equipment.

16 Claims, 8 Drawing Sheets

(51) Int. Cl.
*H04W 72/04* (2009.01)
*H04W 88/02* (2009.01)
*H04W 88/08* (2009.01)

(52) U.S. Cl.
CPC ... *H04W 52/0216* (2013.01); *H04W 72/0446* (2013.01); *H04W 88/02* (2013.01); *H04W 88/08* (2013.01); *Y02D 70/00* (2018.01); *Y02D 70/126* (2018.01); *Y02D 70/1262* (2018.01); *Y02D 70/1264* (2018.01); *Y02D 70/21* (2018.01); *Y02D 70/24* (2018.01); *Y02D 70/26* (2018.01)

(56) References Cited

OTHER PUBLICATIONS

Extended European Search Report issued in corresponding European Patent Application No. 16772277.6, dated Mar. 13, 2018 (9 pages).
International Search Report issued in PCT/JP2016/058195 dated May 24, 2016 (5 pages).
Written Opinion of the International Searching Authority issued in PCT/JP2016/058195 dated May 24, 2016 (4 pages).
3GPP TSG RAN WG2 Meeting #83; R2-132436; InterDigital Communications; "Supporting Extended DRX in RRC_IDLE mode"; Barcelona, Spain; Aug. 19-23, 2013 (6 pages).
3GPP TS 36.331 V12.5.0; "3rd Generation Partnership Project; Technical Specification Group Radio Access Network; Evolved Universal Terrestrial Radio Access (E-UTRA); Radio Resource Control (RRC); Protocol specification (Release 12)"; Mar. 2015 (8 pages).
3GPP TSG RAN WG2 Meeting #83; R2-132613; Samsung; "Enhancements for extended DRX in IDLE"; Barcelona, Spain; Aug. 19-23, 2013 (5 pages).
3GPP TS 36.304 V12.4.0; "3rd Generation Partnership Project; Technical Specification Group Radio Access Network; Evolved Universal Terrestrial Radio Access (E-UTRA); User Equipment (UE) procedures in idle mode (Release 12)"; Mar. 2015 (38 pages).
3GPP TS 36.321 V12.5.0; "3rd Generation Partnership Project; Technical Specification Group Radio Access Network; Evolved Universal Terrestrial Radio Access (E-UTRA); Medium Access Control (MAC) protocol specification; (Release 12)"; Mar. 2015 (77 pages).
3GPP TS 36.331 V12.5.0; "3rd Generation Partnership Project; Technical Specification Group Radio Access Network; Evolved Universal Terrestrial Radio Access (E-UTRA); Radio Resource Control (RRC); Protocol specification; (Release 12)"; Mar. 2015 (445 pages).
3GPP TSG RAN Meeting #67; RP-150493; Qualcomm Incorporated; "New WI Proposal: RAN enhancements for extended DRX in LTE"; Shanghai, China; Mar. 9-12, 2015 (7 pages).

* cited by examiner

MAC-MainConfig information element

```
-- ASN1START
MAC-MainConfig ::=                  SEQUENCE {
    ul-SCH-Config                       SEQUENCE {

DRX-Config ::=                      CHOICE {
    release                             NULL,
    setup                               SEQUENCE {
        onDurationTimer                     ENUMERATED {
                                                psf1, psf2, psf3, psf4, psf5, psf6,
                                                psf8, psf10, psf20, psf30, psf40,
                                                psf50, psf60, psf80, psf100,
                                                psf200},
        drx-InactivityTimer                 ENUMERATED {
                                                psf1, psf2, psf3, psf4, psf5, psf6,
                                                psf8, psf10, psf20, psf30, psf40,
                                                psf50, psf60, psf80, psf100,
                                                psf200, psf300, psf500, psf750,
                                                psf1280, psf1920, psf2560, psf0-v1020,
                                                spare9, spare8, spare7, spare6,
                                                spare5, spare4, spare3, spare2,
                                                spare1},
        drx-RetransmissionTimer             ENUMERATED {
                                                psf1, psf2, psf4, psf6, psf8, psf16,
                                                psf24, psf33},
        longDRX-CycleStartOffset            CHOICE {
            sf10                                INTEGER(0..9),
            sf20                                INTEGER(0..19),
            sf32                                INTEGER(0..31),
            sf40                                INTEGER(0..39),
            sf64                                INTEGER(0..63),
            sf80                                INTEGER(0..79),
            sf128                               INTEGER(0..127),
            sf160                               INTEGER(0..159),
            sf256                               INTEGER(0..255),
            sf320                               INTEGER(0..319),
            sf512                               INTEGER(0..511),
            sf640                               INTEGER(0..639),
            sf1024                              INTEGER(0..1023),
            sf1280                              INTEGER(0..1279),
            sf2048                              INTEGER(0..2047),
            sf2560                              INTEGER(0..2559)
        },
        shortDRX                            SEQUENCE {
            shortDRX-Cycle                      ENUMERATED {
                                                    sf2, sf5, sf8, sf10, sf16, sf20,
                                                    sf32, sf40, sf64, sf80, sf128, sf160,
                                                    sf256, sf320, sf512, sf640},
            drxShortCycleTimer                  INTEGER (1..16)
        }   OPTIONAL                                                    -- Need OR
    }
}

DRX-Config-v1130 ::=                SEQUENCE {
    drx-RetransmissionTimer-v1130       ENUMERATED {psf0-v1130} OPTIONAL,   --Need OR
    longDRX-CycleStartOffset-v1130      CHOICE {
        sf60-v1130                          INTEGER(0..59),
        sf70-v1130                          INTEGER(0..69)
    }                                                       OPTIONAL,   --Need OR
    shortDRX-Cycle-v1130                ENUMERATED   {sf4-v1130} OPTIONAL--Need OR
}

DRX-Config-v13xy ::=                SEQUENCE {
    ExtlongDRX-CycleStartOffset         CHOICE {
        n1                                  INTEGER(0..10240),
        n2                                  INTEGER(0..20480),
        n4                                  INTEGER(0..40960),
        n8                                  INTEGER(0..81920),
        n16                                 INTEGER(0..163840),
        n32                                 INTEGER(0..327680),
        n64                                 INTEGER(0..655360),
        n128                                INTEGER(0..1310720),
        n256                                INTEGER(0..2621440)
    }
}

}
STAG-Id-r11::=          INTEGER (1..maxSTAG-r11)

-- ASN1STOP
```

*ExtLongDRX-CycleStartOffset*
*ExtLongDRX-Coeff* and *drxStartOffset* in TS 36.321 [6]. The value of *ExtendedLongDRX-Cycle* is derived by 10240 *
*ExtLongDRX-Coeff* in number of sub-frames. Value n1 of the ExtLongDRX-Coeff corresponds to 1, n2 corresponds to 2 and so on. The value of *drxStartOffset* value is in number of sub-frames. In case *DRX-Config--v13xy* is signalled, the UE shall ignore *longDRX-CycleStartOffset* (i.e. without suffix) and *longDRX-CycleStartOffset-v1130*.

FIG.8

RadioResourceConfigCommon information element

```
-- ASN1START

RadioResourceConfigCommonSIB ::= SEQUENCE {

PCCH-Config ::=                  SEQUENCE {
    defaultPagingCycle              ENUMERATED {
                                        rf32, rf64, rf128, rf256},
    nB                              ENUMERATED {
                                        fourT, twoT, oneT, halfT, quarterT, oneEighthT,
                                        oneSixteenthT, oneThirtySecondT}

}

PCCH-Config-v13xy ::=            SEQUENCE {
    ExtPagingCycleCoeff             ENUMERATED {
                                        n1, n2, n4, n8, n16, n32, n64, n128, n256},
}

UL-CyclicPrefixLength ::=        ENUMERATED {len1, len2}
-- ASN1STOP
```

*ExtPagingCycleCoeff*
Extended paging cycle coefficient, used to derive 'T' in TS 36.304 [4]. Value n1 corresponds to 1, n2 corresponds to 2 and so on.

FIG.9

UE-RadioPagingInfo information element

```
-- ASN1START

UE-RadioPagingInfo-r12 ::=       SEQUENCE {
    ue-Category-v12xy               INTEGER (0)              OPTIONAL,
    ...,
    [[  extendedPagingCycle-r12     ENUMERATED {supported}              OPTIONAL
    ]]
}
-- ASN1STOP
```

BASE STATION AND USER EQUIPMENT FOR CONFIGURING AN EXTENDED DRX

TECHNICAL FIELD

The present invention relates to a radio communication system.

BACKGROUND ART

In LTE (Long Term Evolution) systems and LTE-Advanced systems, DRX (Discontinuous Reception) control is introduced for battery saving at user equipment (UE). In LTE standard, the DRX control is defined for user equipments in an idle state and user equipments in a connected state, respectively. Even in the DRX in either of the operating states, the user equipment sets a reception period for receiving radio signals transmitted from a base station (evolved Node B: eNB) at a certain constant cycle, and the base station transmits the radio signals to the user equipment in the reception period.

In the LTE systems and the LTE-Advanced systems, the user equipment in the idle state receives a paging message from the base station under the DRX control as follows. In the LTE standard, a paging occasion (PO), which is a subframe for transmitting the paging message, and a paging frame (PF), which is a radio frame possibly including the paging occasion, are determined at both the user equipment and the base station in accordance with the following formula. Namely, the system frame number (SFN) of the PF is determined as follows, $$\text{SFN mod } T = (T \text{ div } N) * (\text{UE\_ID mod } N).$$

Here, T is a DRX cycle for the user equipment to receive the paging message and is represented in the number of radio frames. N is the minimum value of T and nB (nB is a value selected from 4T, 2T, T, T/2, T/4, T/8, T/16 and T/32). Also, UE_ID is determined as follows, $$\text{UE\_ID} = \text{IMSI mod } 1024,$$

where IMSI is the IMSI (International Mobile Subscriber Identity) for the user equipment.

The subframe number of the PO in the PF determined in the above manner is determined from an index i_s and a parameter Ns calculated in accordance with the following formula by using a correspondence table defined in the LTE standard, $$i\_s = \text{floor}(\text{UE\_ID}/N) \text{ mod } Ns,$$

where Ns is the maximum value of 1 and nB/T.

In this manner, the PF and the PO can be uniquely determined from an identifier (IMSI) of the user equipment recognized by both the user equipment and the base station, and the user equipment in the idle state waits to receive the paging message from the base station in the PO configured in the PF. When the base station transmits the paging message in the PO in the determined periodic PF, the user equipment can receive the transmitted paging message.

On the other hand, the user equipment in the connected state receives a PDCCH (Physical Downlink Control Channel) from the base station under the DRX control as follows. In the DRX control in the connected state, the user equipment is managed with two states, that is, an active period where a communication circuit is activated to receive the PDCCH from the base station and an inactive period where the reception circuit is not activated. In the active state, the user equipment monitors the PDCCH from the base station and transmits feedback information and/or an SRS (Sounding Reference Signal). For example, the feedback information may include a CQI (Channel Quality Indicator), a PMI (Precoding Matrix Indicator), a RI (Rank Indicator), a PTI (Precoding Type Indicator) or the like. On the other hand, in the inactive state, the user equipment does not monitor the PDCCH from the base station and does not also transmit the feedback information and the SRS.

In the LTE standard, the active state is defined as cases where any of an On duration timer, a drx-Inactivity timer, a drx-Retransmission timer and a mac-contention Resolution timer is activated, a scheduling request is transmitted, an uplink grant for uplink HARQ retransmission is assigned, or a random access (RA) response is received but no PDCCH indicative of new transmission is received. On the other hand, the inactive state in the DRX control is defined as cases other than the above-stated cases.

Figure 1:
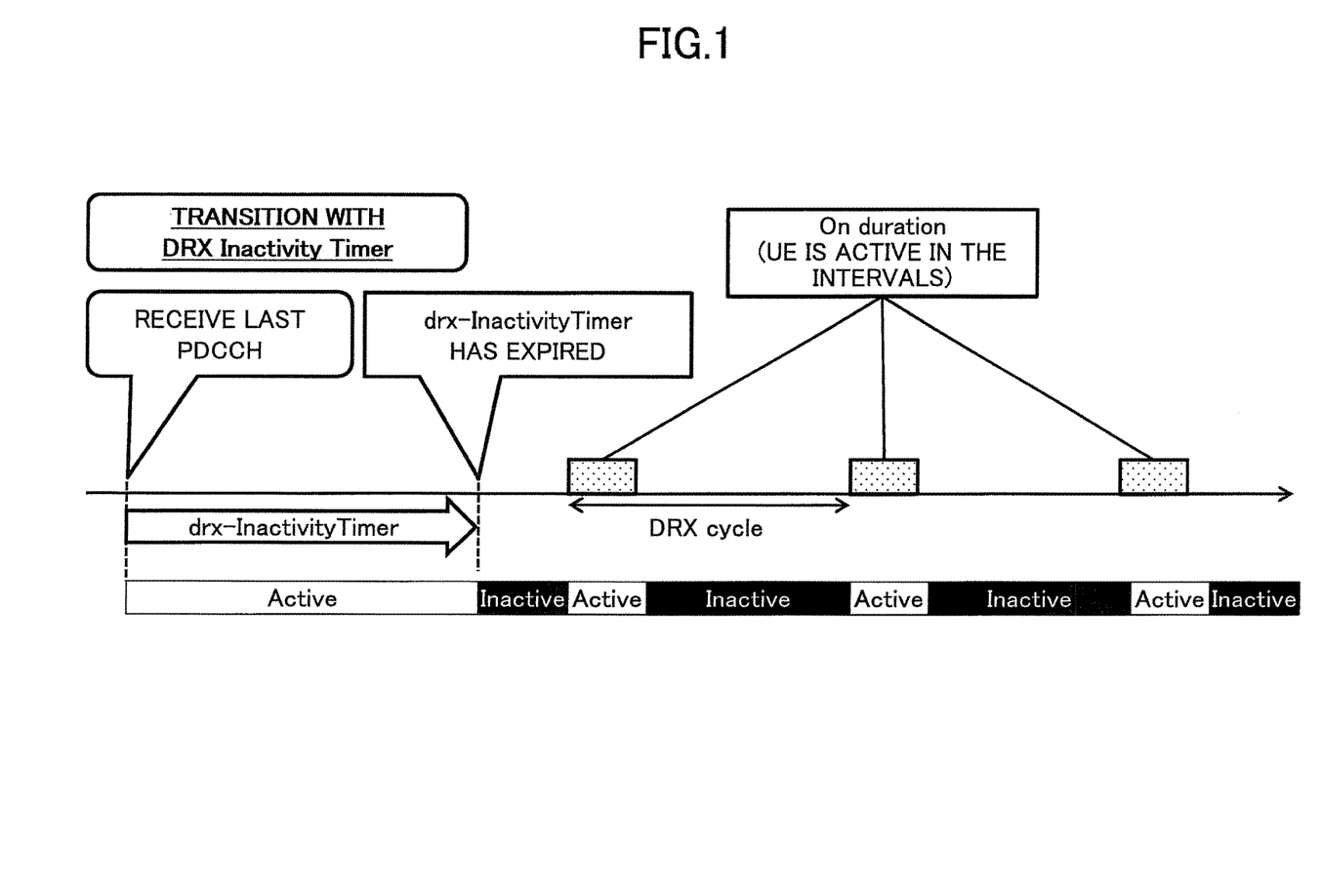
FIG. 1 is a schematic diagram for illustrating exemplary discontinuous reception control from a Connected state.

For example, as illustrated in FIG. 1, when the drx-Inactivity timer has expired, the user equipment transitions from the active state to the inactive state and then activates the DRX. As illustrated, during activation of the DRX, the user equipment transitions to the active state at a constant DRX cycle and attempts to receive the PDCCH from the base station in a period (On duration) of the active state.

Figure 2:
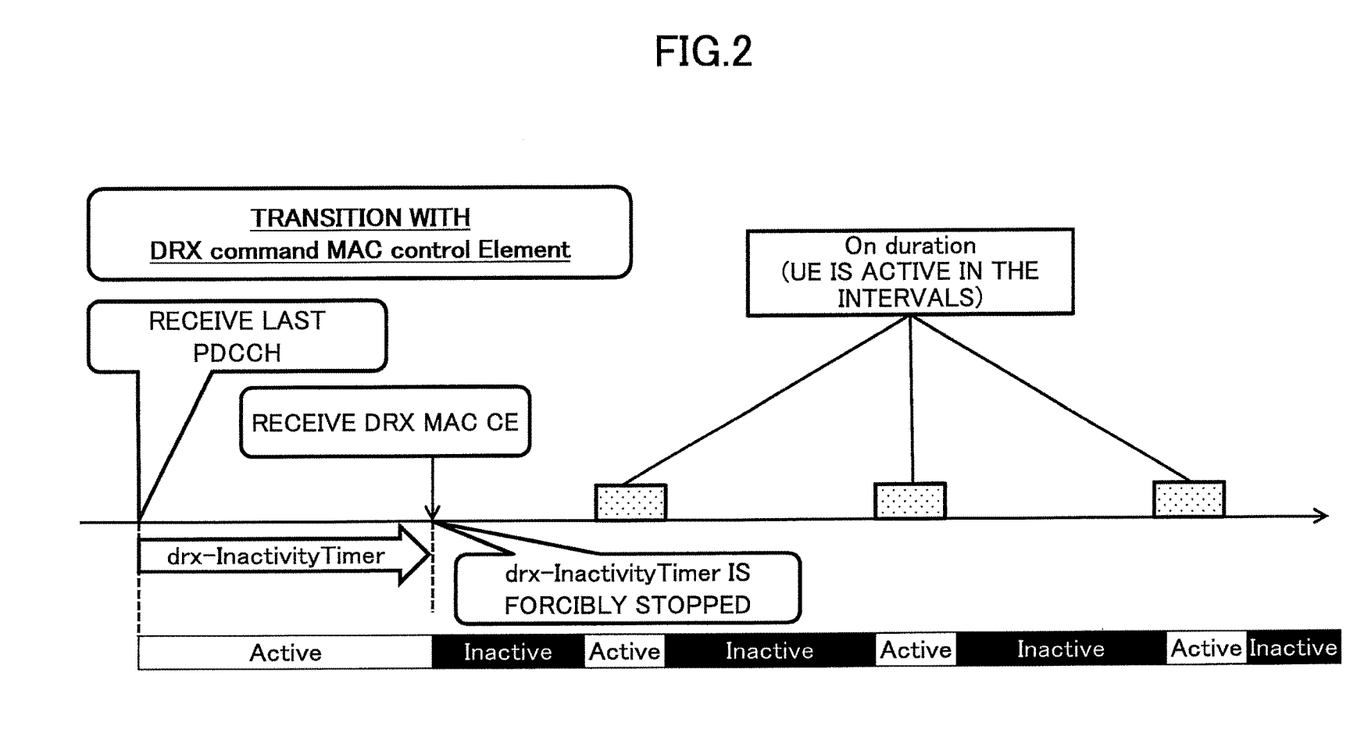
FIG. 2 is a schematic diagram for illustrating another exemplary discontinuous reception control from a Connected state.

Also, as illustrated in FIG. 2, upon receiving a DRX MAC (Medium Access Control) CE (Control Element) including state control information from the base station to indicate that the user equipment should active the DRX, the drx-Inactivity timer is stopped in accordance with the DRX MAC CE. In this case, as illustrated, the user equipment transitions from the active state to the inactive state and then activates the DRX. Similar to FIG. 1, during activation of the DRX, the user equipment transitions to the active state at a constant DRX cycle and attempts to receive the PDCCH from the base station in the period (On duration) of the active state.

Meanwhile, in the presently developed 3GPP Rel-13, it is discussed that the DRX to which a longer DRX cycle than the above-stated current DRX is applied may be introduced to suppress the transition from the idle state to the active state, which may entail increasing signaling amounts and latency, for infrequently communicating MTC (Machine Type Communication) terminals. Specifically, the current DRX cycle can be set as up to 2.56 seconds, but it is discussed that it can be set as longer than 5 minutes, that is, an extended DRX (eDRX) is discussed. Also, it is desirable that the eDRX can be applied to both the DRXs for the above-stated conventional idle state and connection state.

PRIOR ART TECHNICAL DOCUMENT

Non-Patent Document

Non-patent document 1: 3GPP TS 36.304 V12.4.0 (2015-03)
Non-patent document 2: 3GPP TS 36.321 V12.5.0 (2015-03)
Non-patent document 3: 3GPP TS 36.331 V12.5.0 (2015-03)
Non-patent document 4: RP-150493

SUMMARY OF INVENTION

Problem to be Solved by the Invention

In the LTE standard, the user equipment determines a reception period or an On duration for the DRX in accordance with DRX parameters for specifying a cycle (longDRX-Cycle) and a start timing (longDRX-CycleStartOffset) of the DRX indicated from the base station. Here, for the DRX start timing, its range is defined corresponding to the length of the DRX cycle. For example, the start timing can be set from 0th to 39th subframes for the DRX cycle of 40 subframes, and the start timing can be set from 0th to 2559th subframes for the DRX cycle of 2560 subframes. When these DRX parameters are indicated from the base station, the user equipment transitions to the active state in subframes satisfying

[(SFN*10)+subframe number] modulo(longDRX-Cycle)=drxStartOffset.

However, the SFN for identifying each radio frame (10 ms) composed of 10 subframes (subframes #0-#9) can take only values of 0-1023. Accordingly, the DRX cycle can be set for up to 10240 ms, and according to the current LTE standard, the longer DRX cycle such as 5 minutes cannot be set.

In light of the above-stated problem, an object of the present invention is to provide a scheme to configure a longer DRX cycle for the user equipment.

Means for Solving the Problem

In order to achieve the above object, one aspect of the present invention relates to a base station, comprising: a communication control unit configured to control radio communication with user equipment; and a DRX control unit configured to control discontinuous reception (DRX) by the user equipment, wherein the DRX control unit manages a system frame number (SFN), a subframe number and a hyper SFN (HSFN) in the radio communication, wherein the HSFN counts how many times the SFN wraps around, and uses the HSFN to configure an extended DRX (eDRX) having a specified reception period for the user equipment.

Another aspect of the present invention relates to user equipment, comprising: a transmission and reception unit configured to transmit and receive radio signals to/from a base station; and a DRX unit configured to discontinuously receive the radio signals transmitted from the base station, wherein the DRX unit manages a system frame number (SFN), a subframe number and a hyper SFN (HSFN) in radio communication with the base station, wherein the HSFN counts how many times the SFN wraps around, and uses the HSFN to activate an extended DRX (eDRX) having a specified reception period.

Advantage of the Invention

According to the present invention, a longer DRX cycle can be configured for the user equipment.

EMBODIMENTS OF THE INVENTION

Embodiments of the present invention are described below with reference to the drawings.

In embodiments below, a base station and user equipment to implement an extended DRX (eDRX) where a longer DRX cycle can be set by extending conventional discontinuous reception (DRX), that is, the DRX having a reception period configured in a range of system frame numbers (SFNs), are disclosed. Summarizing embodiments as stated below, a hyper SFN (HSFN) for counting how many times the SFN wraps around is introduced as an upper SFN counter. The base station and the user equipment manage the HSFN together with the SFN and the subframe number for use in the conventional DRX and uses the HSFN to set the reception period for the eDRX to have a longer DRX cycle. According to the eDRX using the HSFN, it is possible to reduce power consumption of the user equipment such as an MTC terminal that requires infrequent communication.

Figure 3A:
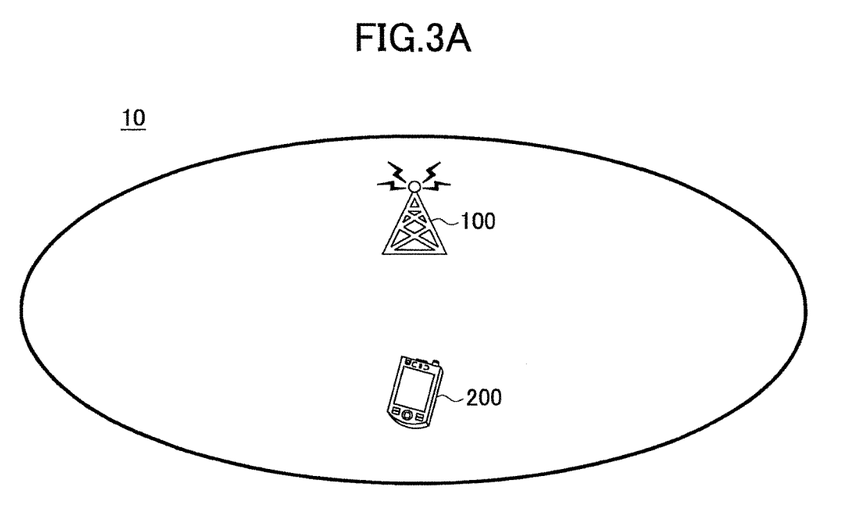
FIG. 3A is a schematic diagram for illustrating a radio communication system according to one embodiment of the present invention.

A radio communication system according to one embodiment of the present invention is described with reference to FIG. 3A. FIG. 3A is a schematic diagram for illustrating a radio communication system according to one embodiment of the present invention.

As illustrated in FIG. 3A, the radio communication system 10 has a base station 100 and user equipment 200. For example, the radio communication system 10 may be an LTE system or an LTE-Advanced system. In the illustrated embodiment, only the single base station 100 is illustrated, but a large number of base stations 100 are disposed to cover a service area of the radio communication system 10. Also, although not shown for ease in description, an upper station such as an MME (Mobility Management Entity) for the base station 100 is typically connected to the base station 100.

The base station 100 wirelessly connects to the user equipment 200 to transmit downlink (DL) packets received from an upper station and/or server communicatively connected to a core network (not shown) to the user equipment 200 and uplink (UL) packets received from the user equipment 200 to the server. In this embodiment, the base station 100 has an extended DRX (eDRX) function using the HSFN as stated below.

Figure 3B:
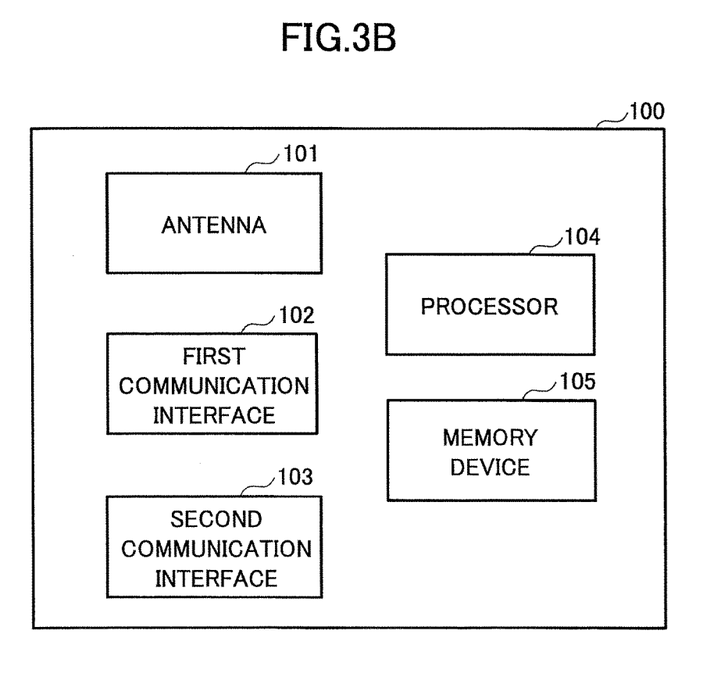
FIG. 3B is a block diagram for illustrating a hardware arrangement of a base station according to one embodiment of the present invention.

As illustrated in FIG. 3B, the base station 100 is typically arranged with hardware resources such as an antenna 101 for transmitting and receiving radio signals to/from the user equipment 200, a first communication interface 102 (X2 interface or the like) for communicating with adjacent base stations, a second communication interface 103 (S1 interface or the like) for communicating with a core network, a processor 104 and/or a circuit for processing signals transmitted and received to/from the user equipment 200 and a memory device 105. Functions and operations of the base station 100 as stated below may be implemented by the processor 104 processing or executing data and/or programs stored in the memory device 105. However, the base station 100 is not limited to the above-stated hardware arrangement and may have any other appropriate hardware arrangement.

Typically, the user equipment 200 may be any appropriate information processing apparatus having a radio communication function such as a smartphone, a cellular phone, a tablet, a mobile router and a wearable terminal. In this embodiment, the user equipment 200 has the eDRX function using the HSFN as stated below.

Figure 3C:
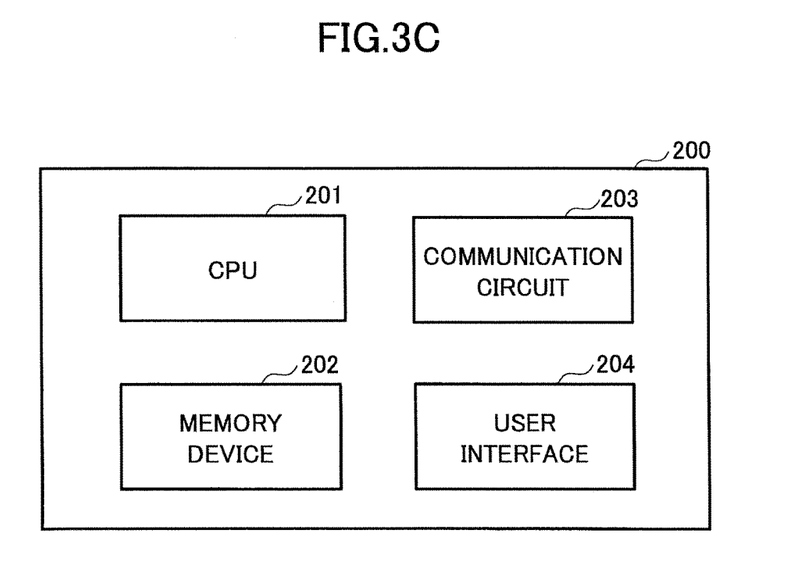
FIG. 3C is a block diagram for illustrating a hardware arrangement of user equipment according to one embodiment of the present invention.

As illustrated in FIG. 3C, the user equipment 200 is arranged with a CPU (Central Processing Unit) 201 such as a processor, a memory device 202 such as a RAM (Random Access Memory) and a flash memory, a radio communication device 203 for transmitting and receiving radio signals to/from the base station 100, a user interface 204 such as an input and output device and a peripheral device, and so on. For example, functions and operations of the user equipment 200 as stated below may be implemented by the CPU 201 processing or executing data and/or programs stored in the memory device 202. However, the user equipment 200 is not limited to the above-stated hardware arrangement and may be formed of circuits for implementing one or more of operations as stated below.

Figure 4:
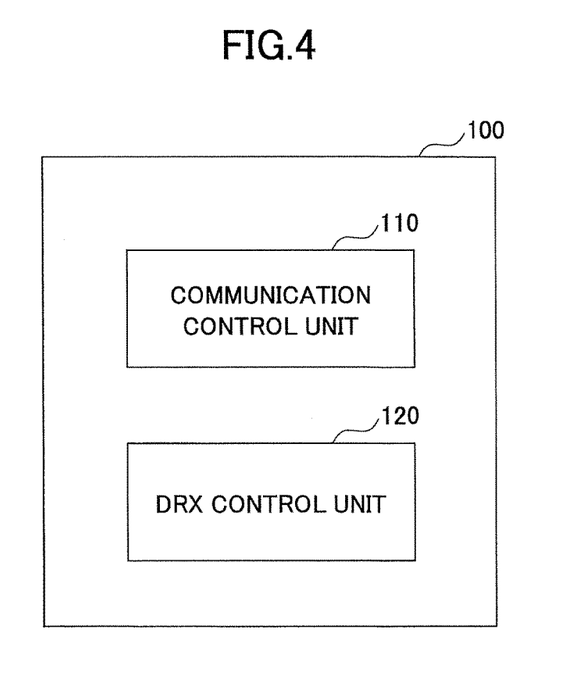
FIG. 4 is a block diagram for illustrating an arrangement of the base station according to one embodiment of the present invention.
Figure 5:
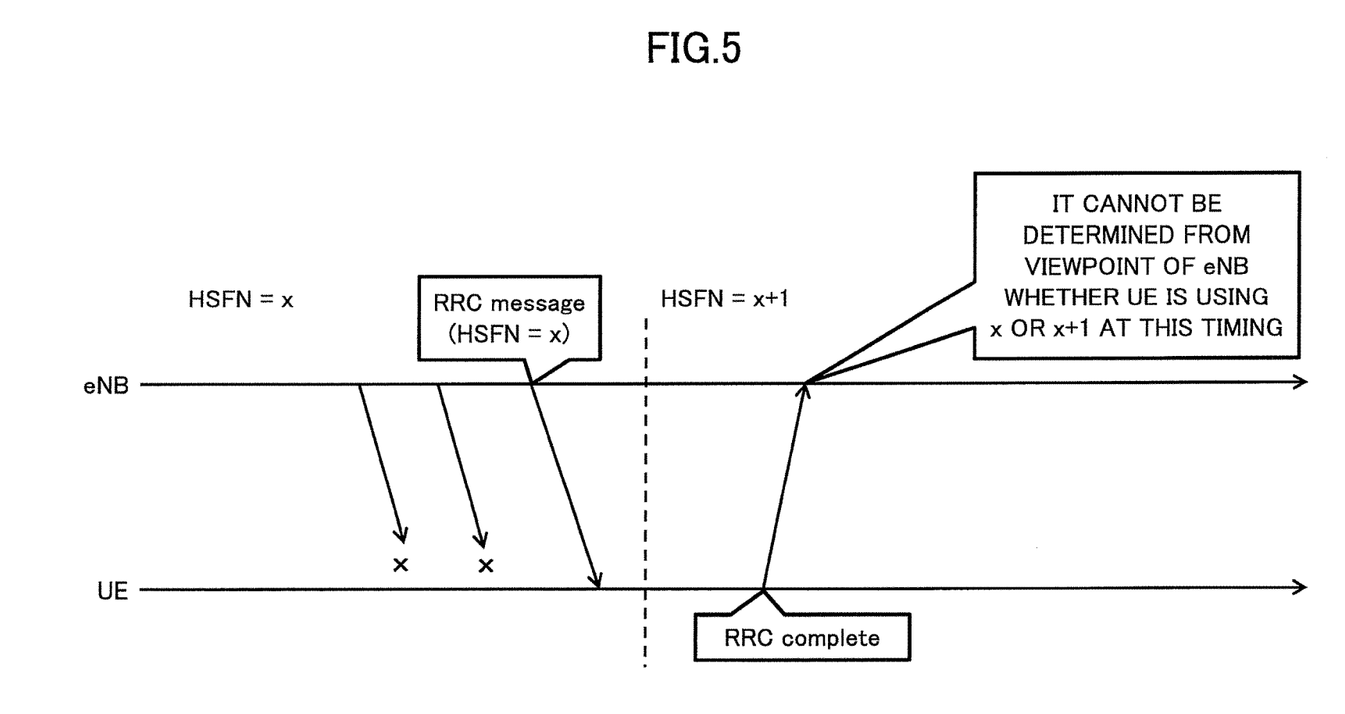
FIG. 5 is a schematic diagram for illustrating a case where a HSFN may be differently recognized between an eNB and UE.

Next, the eDRX control by the base station according to one embodiment of the present invention is described with reference to FIGS. 4 and 5. FIG. 4 is a block diagram for illustrating an arrangement of the base station according to one embodiment of the present invention.

As illustrated in FIG. 4, the base station 100 has a communication control unit 110 and a DRX control unit 120.

The communication control unit 110 controls radio communication with user equipment 200.

Specifically, in downlink communication, the communication control unit 110 transmits control channels such as a PDCCH (Physical Downlink Control Channel) and data channels such as a PDSCH (Physical Downlink Shared Channel) to the user equipment 200. Also, in uplink communication, the communication control unit 110 receives control channels such as a PUCCH (Physical Uplink Control Channel) and data channels such as a PUSCH (Physical Uplink Shared Channel). Also, the communication control unit 110 transmits broadcast information such as a MIB (Master Information Block) and a SIB (System Information Block) to the user equipment 200 visiting a cell of the base station 100.

The DRX control unit 120 controls discontinuous reception (DRX) by the user equipment 200, manages a system frame number (SFN), a subframe number and a hyper SFN (HSFN) for counting how many times the SFN wraps around in the radio communication and uses the HSFN to configure an extended DRX (eDRX) having a specified reception period for the user equipment 200. Specifically, the DRX control unit 120 updates the HSFN, the SFN and the subframe number in accordance with progress of the radio communication and uses the HSFN to configure the extended DRX (eDRX) with a longer DRX cycle for the user equipment 200.

The HSFN according to the present invention serves as an upper counter of the SFN for counting radio frames and is incremented by one whenever the SFN wraps around. In the LTE standard, the SFN for counting the radio frames can take values of 0-1023 and count 1024 radio frames. When a radio frame occurs next to the radio frame corresponding to SFN=1023, the SFN wraps around and is reset to 0, and the HSFN is incremented by one. For example, the next subframe of the subframe #9 at HSFN=3 and SFN=1023 is the subframe #0 at HSFN=4 and SFN=0. In the current LTE standard, the DRX reception period is configured with the SFN and the subframe number, and it can be only configured within 10240 subframes, that is, within the period of 10240 ms. However, the DRX (eDRX) having a longer DRX cycle can be configured by using the HSFN to configure the DRX reception period. In order to implement the eDRX, the base station 100 and the user equipment 200 must have the same recognition on their own managed HSFN, SFN and subframe number. To this end, when the eDRX is configured, the DRX control unit 120 indicates a cycle (longDRX-Cycle) and a start timing (drxStartOffset) of the eDRX reception period and controls the eDRX for the user equipment 200 such that the recognition on the HSFN, the SFN and the subframe number can be matched.

In one embodiment, the DRX control unit 120 may determine whether a subframe calculated from the managed HSFN value, SFN value and subframe number has fallen in the reception period based on a cycle and a start timing of the reception period of the eDRX configured for the user equipment 200. In one example, the DRX control unit 120 may determine that the user equipment 200 will transition to an active state in the subframe that satisfies

[(HSFN)*10240+(SFN*10)+subframe number] mod (longDRX-Cycle)=drxStartOffset.

In this timing, the communication control unit 110 may transmit a PDCCH to the user equipment 200 or wait to receive feedback information and an SRS from the user equipment 200.

In one embodiment, when configuring the eDRX for the user equipment 200, the DRX control unit 120 may indicate a cycle and a start timing of the reception period of the eDRX and the managed HSFN value to the user equipment 200. Specifically, in order to synchronize the HSFN between the base station 100 and the user equipment 200, the DRX control unit 120 may indicate the value of the managed HSFN to the user equipment 200 explicitly. The HSFN value may be indicated in an RRC (Radio Resource Control) message for configuring the eDRX. Upon receiving the HSFN value from the base station 100, the user equipment 200 initializes its own managed HSFN with the received HSFN value and then increments the HSFN whenever the SFN wraps around. Accordingly, in the case where carrier aggregation is configured for the user equipment 200, for example, the DRX control unit 120 can configure the HSFN for the user equipment 200 in a cell unit basis and simplify the eDRX control.

In one embodiment, the DRX control unit 120 may indicate to the user equipment 200 a cycle and a start timing of the reception period of the eDRX, which are represented with a value in a range of the SFN, and a value indicative of the HSFN associated with the reception period. In the LTE standard, the DRX cycle and start timing are indicated in subframe units based absolute values. However, if the DRX cycle and start timing are managed in the absolute values in the eDRX having longer cycles, the base station 100 and the user equipment 200 may have to have complicated implementations. Accordingly, the DRX cycle and start timing in the eDRX may be indicated in combinations of the existing absolute values of the DRX cycle and start timing and relative values of the HSFN. In other words, the DRX control unit 120 may indicate to the user equipment 200 the HSFN associated with the eDRX reception period, more specifically, the HSFN value indicative of how many times the HSFN associated with the reception period is incremented from the current HSFN, and the DRX cycle and start timing indicative of from which subframe the reception period starts in the incremented HSFN, more specifically, the DRX cycle and start timing represented with the absolute values in the conventional DRX. The 10240 subframes in a certain HSFN can be represented with absolutes values in the SFN range in the current LTE standard. As a result, the DRX control unit 120 can identify the eDRX reception period with the combination of the absolute value in the SFN range and the relative value (increment value) from the current HSFN. According to this embodiment, it is possible to suppress increases in signaling amounts compared to the direct representation manner where the eDRX reception period is represented with the absolute value in the HSFN range. Also, the base station 100 and the user equipment 200 do not have to count the absolute value of subframes in the HSFN range, which can simplify the implementation.

In one embodiment, the DRX control unit 120 may suspend configuring the eDRX for the user equipment 200 in a predetermined period immediately before the SFN wraps around. As stated above, the base station 100 and the user equipment 200 must have the same recognition on the HSFN in the eDRX control, but there is a likelihood that the recognition on the HSFN may be mismatched between the base station 100 and the user equipment 200 depending on timings where the base station 100 configures the eDRX for the user equipment 200. Specifically, as illustrated in FIG. 5, when the DRX control unit 120 configures the eDRX immediately before the SFN wraps around, there is a likelihood that it cannot be determined whether the user equipment 200 has configured the HSFN value (x) immediately before the wrapping around or the HSFN value (x+1) after the wrapping around. For example, as illustrated, it is assumed that the communication control unit 110 has transmitted an RRC message for configuring the eDRX to the user equipment 200 immediately before the boundary between the subframe associated with HSFN=x and the subframe associated with HSFN=x+1 and received an RRC complete message for the RRC message at the subframe associated with HSFN=x+1. In this case, the DRX control unit 120 cannot determine which value x or x+1 the user equipment 200 is using for the HSFN. If the recognition on the HSFN is mismatched, the user equipment 200 could not receive a PDCCH from the base station 100. In order to avoid loss of synchronization of the HSFN, the DRX control unit 120 may not configure the eDRX in a predetermined period immediately before the SFN wraps around. Here, the predetermined period may be a period where it is expected that the RRC complete message for the RRC message for configuring the eDRX can be received from the user equipment 200. According to this embodiment, it is possible to avoid occurrence of an ambiguity period, where the mismatched recognition on the HSFN may arise, without causing the user equipment 200 to operate in special control.

In other embodiments, the communication control unit 110 may indicate the managed HSFN value in broadcast information. As stated above, in order to avoid occurrence of loss of synchronization of the HSFN arising due to timings where the base station 100 configures the eDRX for the user equipment 200, the communication control unit 110 may indicate to the user equipment 200 the current HSFN value managed by the DRX control unit 120 by including the managed HSFN value in predetermined broadcast information. Specifically, in response to an instruction to configure the eDRX from the base station, the user equipment 200 may determine the predetermined broadcast information (MIB or the like) transmitted from the communication control unit 110 and reconfigure its own HSFN with the HSFN value in the broadcast information. Although the user equipment 200 commonly determines the MIB only at an initial access timing, upon receiving the instruction to configure the eDRX, the user equipment 200 may be caused to always determine the MIB. Here, the predetermined broadcast information may be the MIB having the SFN or the SIB.

In one embodiment, when configuring the eDRX for the user equipment 200, the DRX control unit 120 may indicate the maximum HSFN value to the user equipment 200. As stated above, if the HSFN value is broadcast in the MIB, the HSFN value would be indicated with ten bits in spare bits in the MIB. If all the ten bits are used for the HSFN, the eDRX cycle could represent up to $2^{20}*10$ ms (=2.91 hours). On the other hand, a larger counter is needed to support the eDRX having such a longer cycle, which may result in over-capability compared to the eDRX cycle values for practical use and cause complicated implementation. In order to avoid an excessive large value of the HSFN, the maximum HSFN value may be specified. For example, if the base station 100 does not support the HSFN value greater than a predetermined value, the DRX control unit 120 may indicate the maximum HSFN value smaller than or equal to the predetermined value at configuring the eDRX for the user equipment 200. When the maximum value is indicated, the user equipment 200 configures its own HSFN value. When the maximum HSFN value is reached, the user equipment 200 will reset the HSFN to zero after the SFN wraps around, which may synchronize the HSFN between the base station 100 and the user equipment 200. Here, the DRX control unit 120 may indicate the maximum value with a bit number in a lower bit such as the least significant bit (LSB) of the HSFN.

In one embodiment, when the user equipment 200 visiting a cell of the base station 100 in an idle state is instructed from an upper node to transmit a paging channel, the DRX control unit 120 may be indicated as to whether the eDRX has been configured for the user equipment 200. As stated above, when the user equipment 200 is in the idle state, the base station 100 transmits a paging message to the user equipment 200 under the DRX control. Typically, it is likely for the user equipment 200 in the idle state to change the connecting cell autonomously. Accordingly, at paging, the DRX control unit 120 has to correctly know whether the eDRX has been configured for the user equipment 200 or what DRX cycle and start timing have been configured. For example, when the user equipment 200 performs cell reselection, the destination base station 100 has to correctly know whether the eDRX has been configured for the paging destination user equipment 200 or whether normal DRX has been configured. Accordingly, at paging, the MME may indicate to the base station 100 that the eDRX has been configured for the user equipment 200. Also, in the indication, the MME may further indicate the DRX cycle and start timing configured for the user equipment 200. Upon receiving the indication, the DRX control unit 120 can recognize that the eDRX is configured for the user equipment 200.

In one embodiment, the communication control unit 110 may indicate in broadcast information that the base station 100 supports the eDRX. As stated above, when the user equipment 200 is in the idle state, the base station 100 transmits a paging message to the user equipment 200 under the DRX control. If the eDRX applied user equipment 200 in the idle state performs cell reselection to a cell of eDRX non-supported base station 100, the destination base station 100 cannot understand timings in an active state of the user equipment 200. For this reason, if the base station 100 supports the eDRX, the communication control unit 110 may indicate in broadcast information that the base station 100 supports the eDRX. In this case, the eDRX configured user equipment 200 may obtain the broadcast information at the cell reselection and retain the applied eDRX if the destination base station 100 supports the eDRX. On the other hand, if the destination base station 100 does not support the eDRX, the user equipment 200 may determine timings for receiving a paging in accordance with the conventional DRX based on the SFN and the subframe number.

In other embodiments, the communication control unit 110 may indicate a cell or a base station having the HSFN synchronized with the base station 100 in broadcast information. As stated above, when the user equipment 200 is in the idle state, the base station 100 transmits a paging message to the user equipment 200 under the DRX control. If the user equipment 200 transitions to the base station or the cell that is not synchronized with the base station 100 with respect to the HSFN, there is a likelihood that the mismatched recognition on the HSFN between the user equipment 200 and the destination base station may arise. Accordingly, the communication control unit 110 may indicate the cell or the base station having the HSFN synchronized with the base station 100 in the broadcast information. For example, bit "1" is assigned in the broadcast information for an adjacent cell or an adjacent base station having the HSFN synchronized, and bit "0" may be assigned in the broadcast information for an adjacent cell or an adjacent base station having the HSFN unsynchronized. As a result, the user equipment 200 can determine whether the destination base station is synchronized with the source base station 100, and if they are not synchronized, the user equipment 200 can connect to the destination base station and update its own HSFN with the HSFN value at the destination base station.

Figure 6:
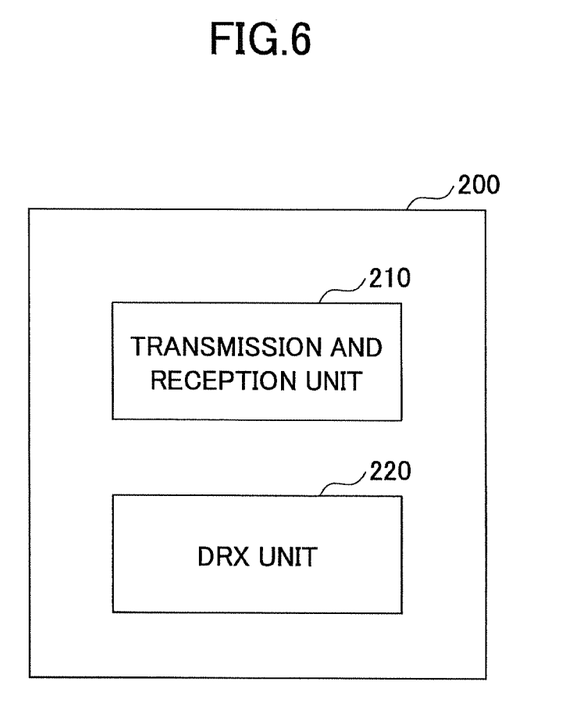
FIG. 6 is a block diagram for illustrating an arrangement of the user equipment according to one embodiment of the present invention.

Next, eDRX operations at the user equipment according to one embodiment of the present invention are described with reference to FIG. 6. FIG. 6 is a block diagram for illustrating an arrangement of the user equipment according to one embodiment of the present invention.

As illustrated in FIG. 6, the user equipment 200 has a transmission and reception unit 210 and a DRX unit 220.

The transmission and reception unit 210 transmits and receives radio signals to/from the base station 100. Specifically, in downlink communication, the transmission and reception unit 210 receives various downlink channels such as a PDCCH and a PDSCH from the base station 100. On the other hand, in uplink communication, the transmission and reception unit 210 transmits various uplink channels such as a PUCCH and a PUSCH to the base station 100. Also, the transmission and reception unit 210 receives broadcast information such as a MIB and a SIB transmitted from the base station 100.

The DRX unit 220 discontinuously receives the radio signals transmitted from the base station 100, manages a system frame number (SFN), a subframe number and a hyper SFN (HSFN) for counting how many times the SFN wraps around in radio communication with the base station, and uses the HSFN to activate an extended DRX (eDRX) having a specified reception period. In other words, the DRX unit 220 updates the HSFN, the SFN and the subframe number over progress of the radio communication and uses the HSFN to perform the extended DRX (eDRX) having a longer DRX cycle.

The HSFN according to the present invention serves as an upper counter of the SFN for counting radio frames and is incremented by one whenever the SFN wraps around. In the LTE standard, the SFN for counting the radio frames can take values from 0 to 1023 and count 1024 radio frames. When the next radio frame of the radio frame corresponding to SFN=1023 occurs, the SFN wraps around and is reset to zero, and the HSFN is incremented by one. For example, the next subframe of the subframe #9 at HSFN=3 and SFN=1023 would be the subframe #0 at HSFN=4 and SFN=0. In the current LTE standard, the DRX reception period is configured with the SFN and the subframe number and accordingly can be configured only within 10240 subframes, that is, within a period of 10240 ms. However, it is possible to configure the extended DRX (eDRX) having a longer DRX cycle by using the HSFN to configure the DRX reception period. In order to implement the eDRX, the base station 100 and the user equipment 200 have to have the matched recognition on the managed respective HSFN, SFN and subframe number. To this end, the DRX unit 220 activates the eDRX based on the cycle (longDRX-Cycle) and the start timing (drxStartOffset) of the eDRX reception period received at the eDRX configuration timing from the base station 100 as well as the managed HSFN, SFN and subframe number.

In one embodiment, when a subframe calculated from the managed HSFN value, SFN value and subframe number falls in the reception period configured in accordance with a cycle and a start timing of the reception period of the eDRX configured by the base station 100, the DRX unit 220 may discontinuously receive the radio signals transmitted from the base station 100. In one example, the DRX unit 220 may attempt to receive a PDCCH from the base station 100 at the subframe corresponding to

[(HSFN)*10240+(SFN*10)+subframe number] mod (longDRX-Cycle)=drxStartOffset.

Also, at this timing, the transmission and reception unit 210 may transmit feedback information and/or an SRS to the base station 100.

In one embodiment, when the DRX unit 220 is indicated to configure the eDRX from the base station 100, the DRX unit 220 may set the HSFN to a predetermined initial value. Specifically, upon receiving an RRC message for configuring the eDRX from the base station 100, the DRX unit 220 may set the HSFN to an initial value preconfigured by the base station 100. Accordingly, the base station 100 can recognize the HSFN at the user equipment 200 without indicating the HSFN in the RRC message and synchronize the HSFN with the user equipment 200 without increasing signaling amounts. Here, the predetermined initial value may be zero or indicated in broadcast information such as a MIB beforehand.

In one embodiment, when the DRX unit 220 is indicated to configure the eDRX from the base station 100, the DRX unit 220 may indicate the managed HSFN value to the base station 100. Specifically, the DRX unit 220 autonomously manages the HSFN, and in response to an indication to configure the eDRX from the base station 100, the DRX unit 220 indicates the current HSFN value to the base station 100. The base station 100 can recognize the HSFN at the user equipment 200 based on the indication and synchronize the HSFN with the user equipment 200. For example, if the indication to configure the eDRX is transmitted in an RRC connection reconfiguration message, the DRX unit 220 may indicate the current HSFN value in an RRC connection reconfiguration complete message for the RRC connection reconfiguration message.

In one embodiment, upon obtaining the HSFN value from the base station 100, the DRX unit 220 may determine whether an On duration timer for timing the eDRX reception period or a DRX-Inactivity timer for timing passage from the last reception of a control channel from the base station 100 is activated and stop or reactivate the On duration timer or the DRX-Inactivity timer. There is a likelihood that when the HSFN value is newly obtained, the activation timing of the On duration timer may be changed. For this reason, if the On duration timer or the drx-Inactivity timer is active at the timing of obtaining the HSFN in broadcast information or a dedicated signal, the DRX unit 220 may temporarily stop or reactivate them. Also, stopping the timers may be separately defined as new operations or may be implemented by using existing operations such as MAC reset.

In one embodiment, the DRX unit 220 may configure the reception period based on the cycle and the start timing of the eDRX reception period represented with values within the SFN range and a value indicative of the HSFN associated with the reception period. In the LTE standard, the DRX cycle and start timing are indicated in subframe unit based absolute values. However, if the DRX cycle and start timing are managed and indicated with the absolute values in the eDRX having a longer cycle, the base station 100 and the user equipment 200 may have complicated implementations. Accordingly, the DRX cycle and start timing in the eDRX may be indicated in combinations of the DRX cycle and start timing in the existing absolute values and a relative value of the HSFN. In other words, the base station 100 may indicate to the user equipment 200 the HSFN associated with the eDRX reception period, specifically, the HSFN value indicating how many times the HSFN should be incremented from the current HSFN to reach the eDRX reception period, and the cycle and the start timing indicative of the start subframe of the reception period in the incremented HSFN. For example, upon receiving the cycle and the start timing of the eDRX reception period represented within the SFN range and a certain HSFN value n, the DRX unit 220 first sets the HSFN to a predetermined initial value. Then, the DRX unit 220 increments the HSFN until (n−1) in progress of the radio communication. When the HSFN reaches (n−1), the DRX unit 220 determines whether the subframe at that HSFN has fallen in the reception period represented within the SFN range. If the current subframe has fallen in the reception period, the DRX unit 220 activates discontinuous reception and resets the HSFN to the initial value. In this manner, the DRX unit 220 can identify the eDRX reception period with the combination of the absolute values within the SFN range and a relative value (increment value) from the current HSFN. As a result, it is possible to suppress increase in signaling amounts compared to the direct representation manner where the eDRX reception period is represented with the absolute values within the HSFN range. Also, the base station 100 and the user equipment 200 do not have to count the absolute value of subframes in the HSFN range, which can simplify implementations.

In one embodiment, when the DRX unit 220 is instructed to configure the eDRX from the base station 100, the DRX unit 220 may indicate the HSFN value configured for the eDRX to the base station 100. As stated above with reference to FIG. 5, there is a likelihood that recognition of the HSFN may be mismatched between the base station 100 and the user equipment 200 depending on timings where the base station 100 configures the eDRX for the user equipment 100. Accordingly, the DRX unit 220 may indicate to the base station 100 the HSFN value configured by the DRX unit 220 for the eDRX. As a result, the recognition of the HSFN between the base station 100 and the user equipment 200 can be matched without performing scheduling restriction at the base station 100 such as refraining from configuring the eDRX immediately before the HSFN is incremented. The HSFN value may be indicated in a MAC CE, for example. Also, the DRX unit 220 may indicate the HSFN value to the base station 100 at the timing of transmitting a PUSCH together with an RRC connection reconfiguration complete message. As a result, the base station 100 can know the HSFN value at the user equipment 200 backward to transmission timing of an uplink grant.

In one embodiment, when the DRX unit 220 is instructed to configure the eDRX from the base station 100, the DRX unit 220 may obtain the HSFN value from broadcast information from the base station 100 and configure the managed HFSN value with the obtained HSFN value. As stated above, in order to avoid loss of synchronization of the HSFN arising depending on timings where the base station 100 configures the eDRX for the user equipment 200, the base station 100 may indicate the current HSFN value to the user equipment 200 by including the managed HSFN value in predetermined broadcast information. Then, when the DRX unit 220 is instructed to configure the eDRX from the base station 100, the DRX unit 220 may determine the predetermined broadcast information (MIB or the like) transmitted from the base station 100 and reconfigure its own HSFN with the HSFN value in the broadcast information. Although the user equipment 200 normally checks the MIB only at an initial access timing, in response to reception of an eDRX configuration instruction, the user equipment 200 may always check the MIB. Here, the predetermined broadcast information may be the MIB having the SFN or a SIB.

In one embodiment, upon receiving the maximum HFSN value from the base station 100, the DRX unit 220 may wrap around the HSFN after incrementing the HSFN to the maximum value. In other words, when the HSFN reaches the maximum value, the DRX unit 220 may wrap around and reset the HSFN to zero in response to the SFN wrapping around the next time.

In one embodiment, the transmission and reception unit 210 may indicate to the base station 100 a maximum value of the HSFN supported by the user equipment 200 as capability information. For example, if the user equipment 200 does not support the HSFN greater than a predetermined value, the DRX unit 220 may indicate the HSFN maximum value smaller than or equal to the predetermined value at transmitting the capability information to the base station 100. When the maximum value is indicated, the base station 100 can configure the DRX cycle and start timing corresponding to the HSFN maximum value of the user equipment 200. Also, the capability information may be transmitted in response to only receiving enquiry of the capability information (capability enquiry or the like) from the base station 100.

In one embodiment, when the user equipment 200 transitions to a cell of the base station 100 in an idle state, the DRX unit 220 may determine whether the base station 100 supports the eDRX based on broadcast information received from the base station 100. As stated above, when the user equipment 200 is in the idle state, the base station 100 transmits a paging message to the user equipment 200 under the DRX control. If the eDRX applied user equipment 200 in the idle state transitions to the cell of the eDRX unsupported base station 100, the destination base station 100 cannot understand timings in an active state of the user equipment 200. For this reason, if the base station supports the eDRX, the base station may indicate in the broadcast information that the base station 100 supports the eDRX. In this case, the DRX unit 220 may obtain the broadcast information at cell reselection and retain the applied eDRX if the destination base station 100 supports the eDRX. On the other hand, if the destination base station 100 does not support the eDRX, the DRX unit 220 may determine the timings of receive a paging in accordance with the conventional DRX based on the SFN and subframe number.

In one embodiment, when the user equipment 200 transitions to a cell of the base station 100 in an idle state, the DRX unit 220 may determine whether the destination base station is synchronized with the source base station with respect to the HSFN based on broadcast information received from the base station 100, and if the destination base station 100 is not synchronized with the source base station with respect to the HSFN, the DRX unit 220 may connect to the destination base station 100 to obtain the HSFN value managed at the destination base station 100. As stated above, when the user equipment 200 is in the idle state, the base station 100 transmits a paging message to the user equipment 200 under the DRX control. If the user equipment 200 transitions to the base station 100 or the cell unsynchronized with respect to the HSFN, there is a likelihood that recognition of the HSFN may be mismatched between the user equipment 200 and the destination base station 100. The DRX unit 220 may determine whether the destination base station 100 is synchronized with the source base station based on the obtained broadcast information, and if they are not synchronized, the user equipment 200 can connect to the destination base station 100 and update its own HSFN with the HSFN value at the base station 100.

Next, signaling for the eDRX control according to one embodiment of the present invention is described with reference to FIGS. 7-9.

Figure 7:
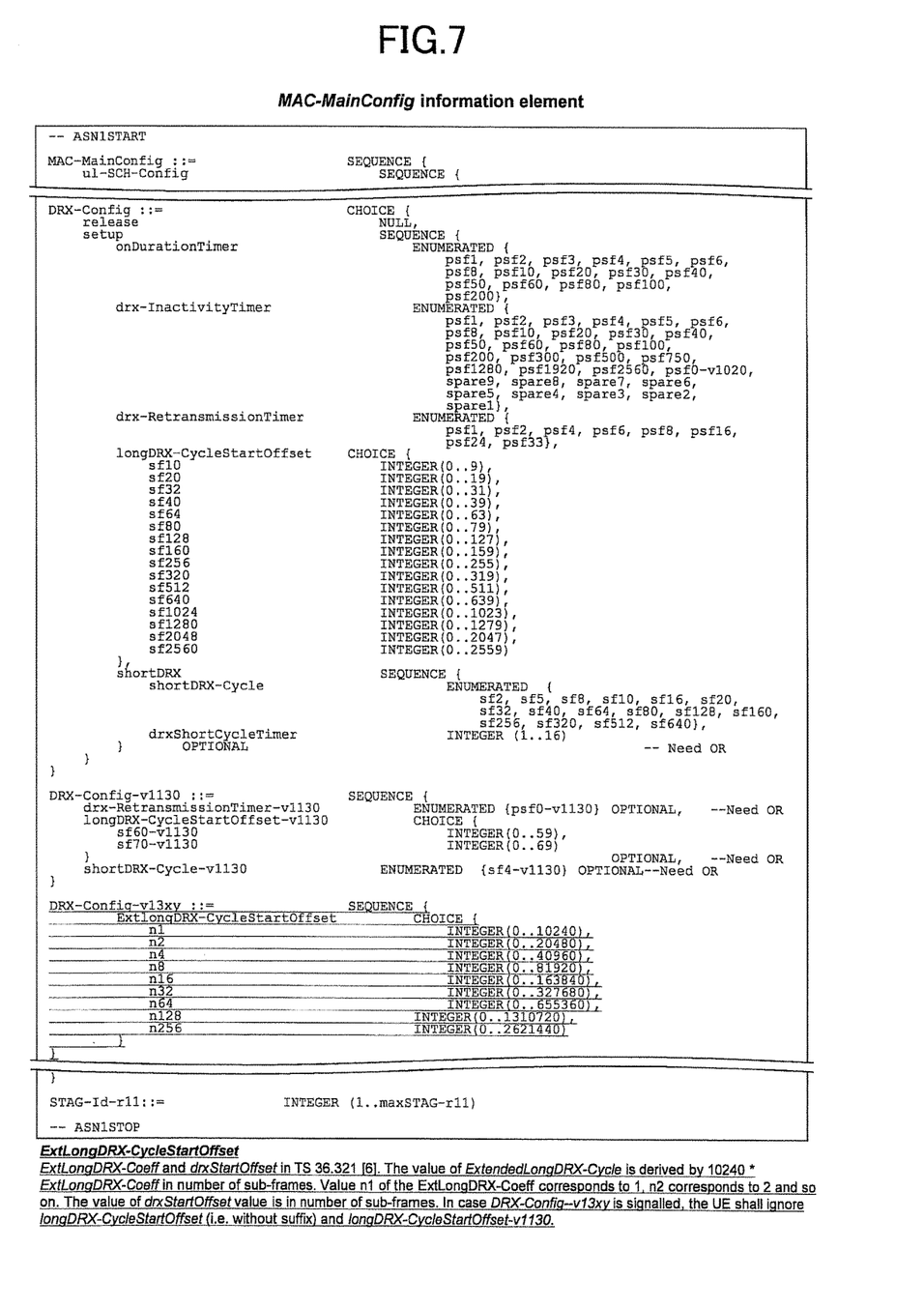
FIG. 7 is a diagram for illustrating exemplary signaling in eDRX control according to one embodiment of the present invention.

FIG. 7 is a diagram for illustrating exemplary signaling for the eDRX control according to one embodiment of the present invention. The base station 100 configures the eDRX for the user equipment 200 with signaling having a data structure as illustrated. The DRX cycle and start timing of the eDRX are specified in "ExtlongDRX-CycleStartOffset". "ExtlongDRX-CycleStartOffset" may be composed of "ExtLongDRX-Coeff" and "drxStartOffset". Here, the eDRX cycle may be derived from 10240*ExtLongDRX-Coeff. Also, in the case where the reception period is configured based on the cycle and the start timing of the eDRX reception period represented with values within the SFN range and a value indicative the HSFN associated with the reception period, the cycle and the start timing of the eDRX reception period represented with the values within the SFN range are indicated in "longDRX-Cycle" and "drxStartOffset", respectively, and the value indicative of the HSFN associated with the reception period may be indicated in "ExtLongDRX-Coeff".

Figure 8:
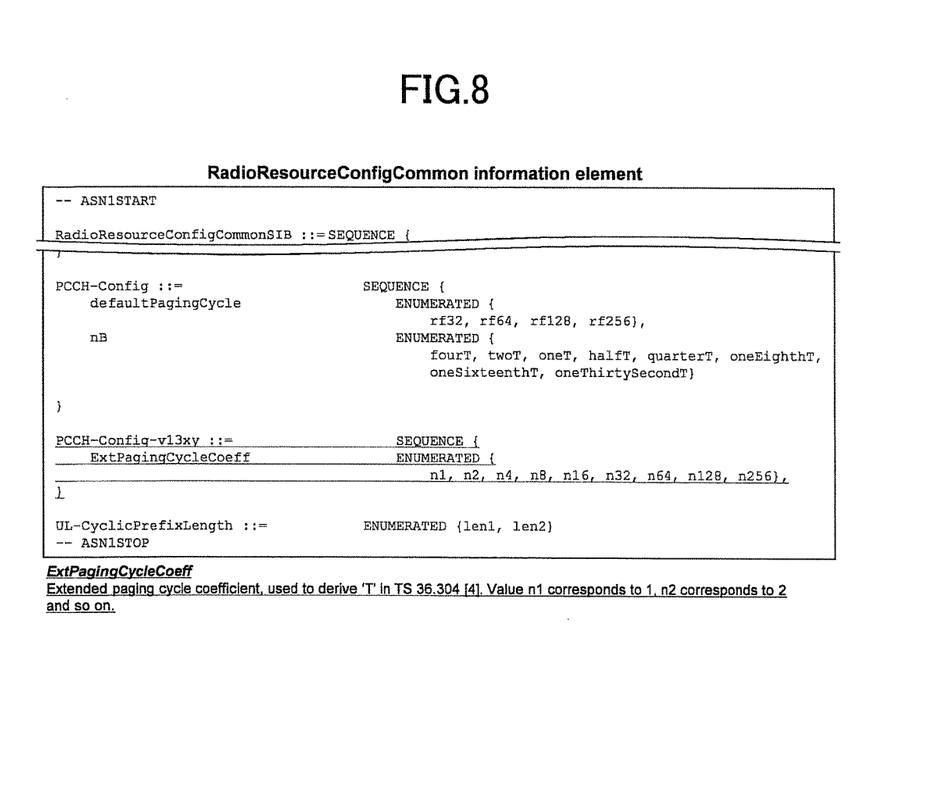
FIG. 8 is a diagram for illustrating exemplary signaling in eDRX control according to one embodiment of the present invention.

FIG. 8 is a diagram for illustrating exemplary signaling for the eDRX control according to one embodiment of the present invention. The base station 100 may indicate a paging to the user equipment 200 in the idle state with signaling having a data structure as illustrated. Here, a paging frame (PF) may be determined in accordance with $$\text{SFN mod } T = (T \text{ div } N)*(\text{UE\_ID mod } N) \text{ or}$$

$$(Y \times \text{SFN}) \text{mod } T = (T \text{ div } N)*(\text{UE\_ID mod } N) \text{ for } 0 \le Y \le (Ec-1) \text{ (case where an extended paging cycle coefficient is configured by an upper layer)},$$

where T is the DRX cycle at the user equipment 200 for receiving a paging message and is represented with the number of radio frames. N is the minimum value of T and nB (nB is a value selected from 4T, 2T, T, T/2, T/4, T/8, T/16 and T/32). Also, UE_ID is determined in accordance with $$\text{UE\_ID} = \text{IMSI mod } 1024 \text{ or}$$

$$\text{IMSI mod}(1024 \times Ec) \text{ (case where an extended paging cycle coefficient is configured by an upper layer)},$$

where IMSI is the IMSI (International Mobile Subscriber Identity) for the user equipment. Also, Ec is the extended paging cycle coefficient used to derive T, and if the extended paging cycle coefficient is configured by an upper layer, the DRX cycle may be derived in accordance with 1024×Ec.

Figure 9:
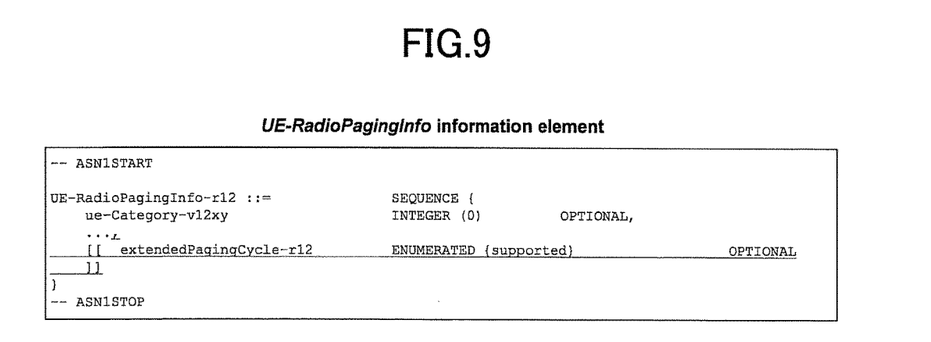
FIG. 9 is a diagram for illustrating exemplary signaling in eDRX control according to one embodiment of the present invention.

FIG. 9 is a diagram for illustrating exemplary signaling for the eDRX control according to one embodiment of the present invention. The base station 100 indicates information required for paging to the user equipment 200 supporting the extended paging cycle with signaling having a data structure as illustrated.

Although the embodiments of the present invention have been described in detail, the present invention is not limited to the above-stated specific embodiments, and various modifications and variations can be made within the spirit of the present invention as recited in claims.

This international patent application is based on and claims priority of Japanese Priority Application No. 2015-077226 filed on Apr. 3, 2015, the entire contents of which are hereby incorporated by reference.

LIST OF REFERENCE SYMBOLS

10: radio communication system
100: base station
110: communication control unit
120: DRX control unit
200: user equipment
210: transmission and reception unit
220: DRX control unit

The invention claimed is:
1. A base station, comprising:
a communication control unit configured to control radio communication with user equipment; and
a DRX control unit configured to control discontinuous reception (DRX) by the user equipment,
wherein the DRX control unit manages a system frame number (SFN), a subframe number and a hyper SFN (HSFN) in the radio communication, wherein the HSFN counts how many times the SFN wraps around, and uses the HSFN to configure an extended DRX (eDRX) having a specified reception period for the user equipment, and wherein the communication control unit receives a maximum value of the HSFN supported by the user equipment as capability information from the user equipment.

2. The base station as claimed in claim 1, wherein the DRX control unit determines whether a subframe calculated from the managed HSFN value, SFN value and subframe number falls in the reception period based on a cycle and a start timing of the reception period of the eDRX configured for the user equipment.

3. The base station as claimed in claim 1, wherein when configuring the eDRX for the user equipment, the DRX control unit indicates a cycle and a start timing of the reception period of the eDRX and the managed HSFN value to the user equipment.

4. The base station as claimed in claim 1, wherein the DRX control unit indicates to the user equipment a cycle and a start timing of the reception period of the eDRX, wherein the cycle and the start timing are represented with a value in a range of the SFN, and a value indicative of the HSFN associated with the reception period.

5. The base station as claimed in claim 1, wherein the DRX control unit suspends configuring the eDRX for the user equipment in a predetermined period immediately before the SFN wraps around.

6. The base station as claimed in claim 2, wherein when configuring the eDRX for the user equipment, the DRX control unit indicates a cycle and a start timing of the reception period of the eDRX and the managed HSFN value to the user equipment.

7. The base station as claimed in claim 2, wherein the DRX control unit indicates to the user equipment a cycle and a start timing of the reception period of the eDRX, wherein the cycle and the start timing are represented with a value in a range of the SFN, and a value indicative of the HSFN associated with the reception period.

8. The base station as claimed in claim 3, wherein the DRX control unit indicates to the user equipment a cycle and a start timing of the reception period of the eDRX, wherein the cycle and the start timing are represented with a value in a range of the SFN, and a value indicative of the HSFN associated with the reception period.

9. The base station as claimed in claim 2, wherein the DRX control unit suspends configuring the eDRX for the user equipment in a predetermined period immediately before the SFN wraps around.

10. The base station as claimed in claim 3, wherein the DRX control unit suspends configuring the eDRX for the user equipment in a predetermined period immediately before the SFN wraps around.

11. A user equipment, comprising:
a transmission and reception unit configured to transmit and receive radio signals to/from a base station; and
a DRX unit configured to discontinuously receive the radio signals transmitted from the base station,
wherein the DRX unit manages a system frame number (SFN), a subframe number and a hyper SFN (HSFN) in radio communication with the base station, wherein the HSFN counts how many times the SFN wraps around, and uses the HSFN to activate an extended DRX (eDRX) having a specified reception period, and
wherein the transmission and reception unit indicates to the base station a maximum value of the HSFN supported by the user equipment as capability information.

12. The user equipment as claimed in claim 11, wherein when a subframe calculated from the managed HSFN value, SFN value and subframe number falls in the reception period configured in accordance with a cycle and a start timing of the reception period of the eDRX configured by the base station, the DRX unit discontinuously receives the radio signals transmitted from the base station.

13. The user equipment as claimed in claim 11, wherein when the DRX unit is indicated to configure the eDRX from the base station, the DRX unit sets the HSFN to a predetermined initial value.

14. The user equipment as claimed in claim 11, wherein when the DRX unit is indicated to configure the eDRX from the base station, the DRX unit indicates the managed HSFN value to the base station.

15. The user equipment as claimed in claim 12, wherein when the DRX unit is indicated to configure the eDRX from the base station, the DRX unit sets the HSFN to a predetermined initial value.

16. The user equipment as claimed in claim 12, wherein when the DRX unit is indicated to configure the eDRX from the base station, the DRX unit indicates the managed HSFN value to the base station.

* * * * *